(12) United States Patent
Grant et al.

(10) Patent No.: US 10,427,763 B2
(45) Date of Patent: Oct. 1, 2019

(54) DEPLOYMENT AND RETRIEVAL METHODS FOR AUVS

(71) Applicant: Autonomous Robotics Limited, Warminster Wiltshire (GB)

(72) Inventors: David Alexander William Grant, Warminster (GB); Arran James Holloway, Warminster (GB); James Charles Hill, Rotherham (GB); William James Birdsall, Rotherham (GB)

(73) Assignee: Autonomous Robotics Limited, Warminster, Wiltshire (GB)

( * ) Notice: Subject to any disclaimer, the term of this patent is extended or adjusted under 35 U.S.C. 154(b) by 0 days.

(21) Appl. No.: 15/767,807

(22) PCT Filed: Oct. 14, 2016

(86) PCT No.: PCT/GB2016/053189
§ 371 (c)(1),
(2) Date: Apr. 12, 2018

(87) PCT Pub. No.: WO2017/064503
PCT Pub. Date: Apr. 20, 2017

(65) Prior Publication Data
US 2018/0304977 A1     Oct. 25, 2018

(30) Foreign Application Priority Data

Oct. 16, 2015   (GB) .................................. 1518297.5

(51) Int. Cl.
*B63B 35/40*     (2006.01)
*B63B 27/36*     (2006.01)
(Continued)

(52) U.S. Cl.
CPC .............. *B63B 35/40* (2013.01); *B63B 21/66* (2013.01); *B63B 27/36* (2013.01); *B63G 8/001* (2013.01);
(Continued)

(58) Field of Classification Search
CPC ......... B63B 35/40; B63B 21/66; B63B 27/36; B63G 8/001; B63G 2008/004; B63G 2008/008; G01V 1/3843
See application file for complete search history.

(56) References Cited

U.S. PATENT DOCUMENTS 5,253,605 A * 10/1993 Collins ................... B63B 21/66
114/258
7,632,043 B2    12/2009 Thompson et al.
(Continued)

FOREIGN PATENT DOCUMENTS

WO     WO 2014/147165 A1    9/2014
WO     WO 2014/173976 A1    10/2014

OTHER PUBLICATIONS

Mar. 17, 2016 UKIPO Search Report for GB 15 18297.5.
(Continued)

*Primary Examiner* — Stephen P Avila
(74) *Attorney, Agent, or Firm* — Hahn Loeser & Parks, LLP

(57) ABSTRACT

A submersible device (2) for deploying or retrieving autonomous underwater vehicles (AUVs), the submersible device comprising: two or more platforms (130) arranged in a stack (3a, 3b), wherein each platform is configured to carry two or more of the AUVs; a port (300, 310); and a transfer mechanism (200) comprising a transfer device (210) arranged to load or unload the AUVs onto or from the platforms, and an actuator arranged to move the transfer
(Continued)

device between the platforms and the port in order to transfer the AUVs between the platforms and the port.

20 Claims, 14 Drawing Sheets

(51) Int. Cl.
*B63G 8/00* (2006.01)
*G01V 1/38* (2006.01)
*B63B 21/66* (2006.01)
*B63B 27/16* (2006.01)

(52) U.S. Cl.
CPC ...... *G01V 1/3843* (2013.01); *B63B 2027/165* (2013.01); *B63G 2008/004* (2013.01); *B63G 2008/008* (2013.01)

(56) References Cited

U.S. PATENT DOCUMENTS

| | | | |
|---|---|---|---|
| 8,310,899 B2 | 11/2012 | Woodard, Jr. et al. | |
| 8,881,665 B2 | 11/2014 | Brizard et al. | |
| 2011/0217123 A1* | 9/2011 | Jewell | G01V 1/3852 405/158 |
| 2014/0078861 A1 | 3/2014 | Tamanaja | |
| 2014/0177387 A1 | 6/2014 | Brizard | |
| 2015/0251739 A1* | 9/2015 | Ryuh | B25J 11/00 114/338 |

OTHER PUBLICATIONS

Sep. 12, 2016 ISR for PCT/GB2016/053189.
Sep. 12, 2016 Written Opinion of Int'l Searching Authority for PCT/GB2016/053189.

* cited by examiner

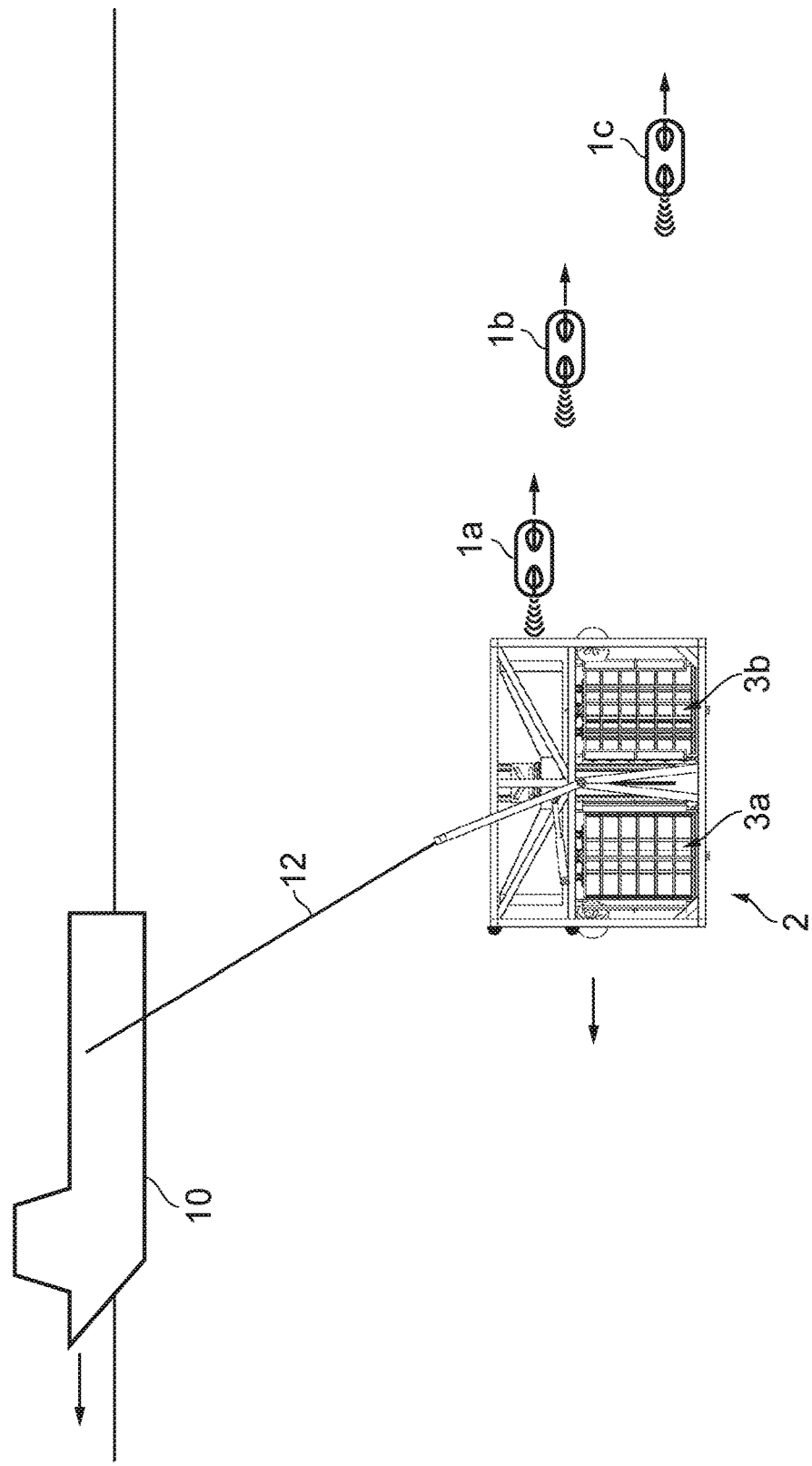

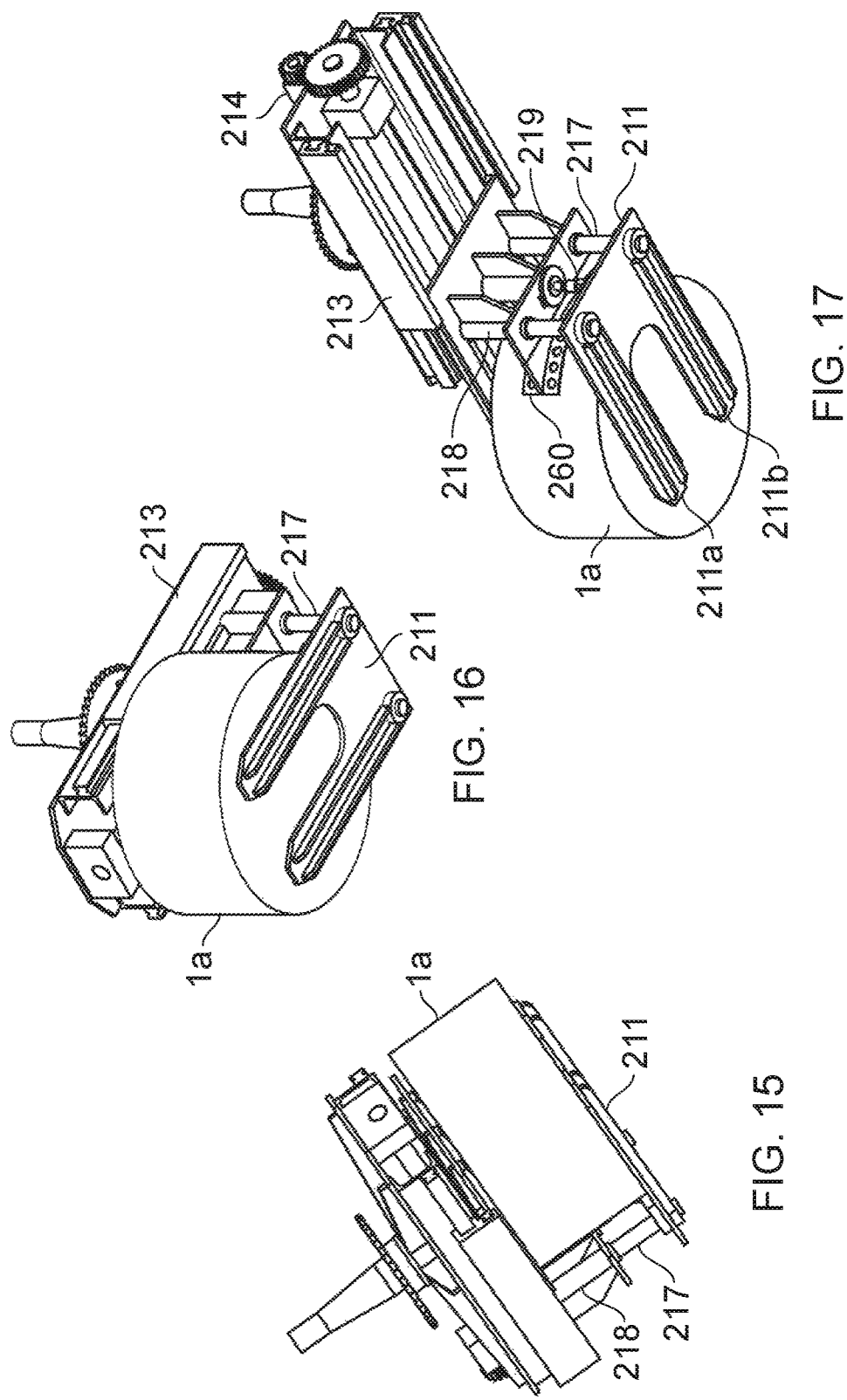

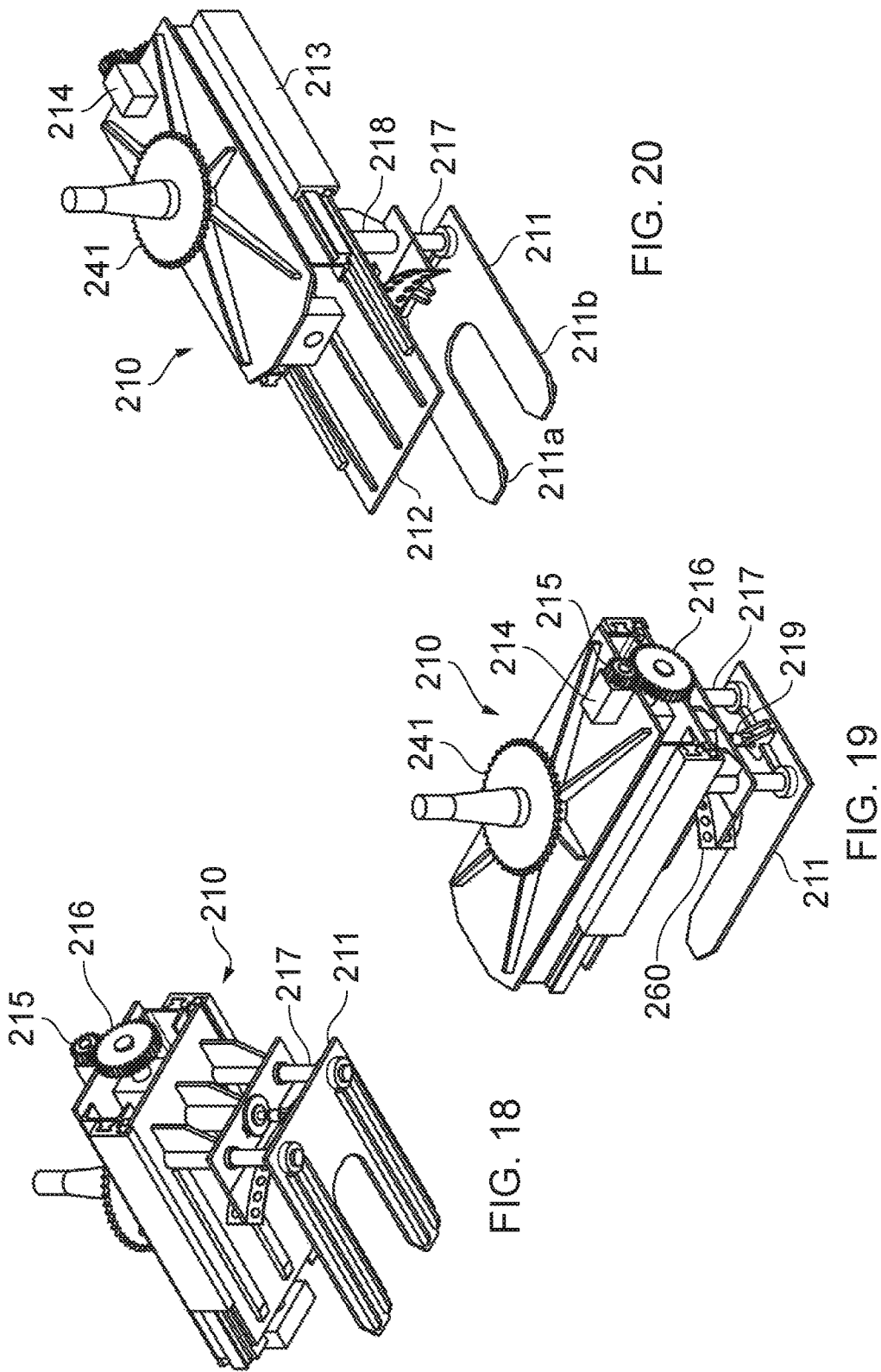

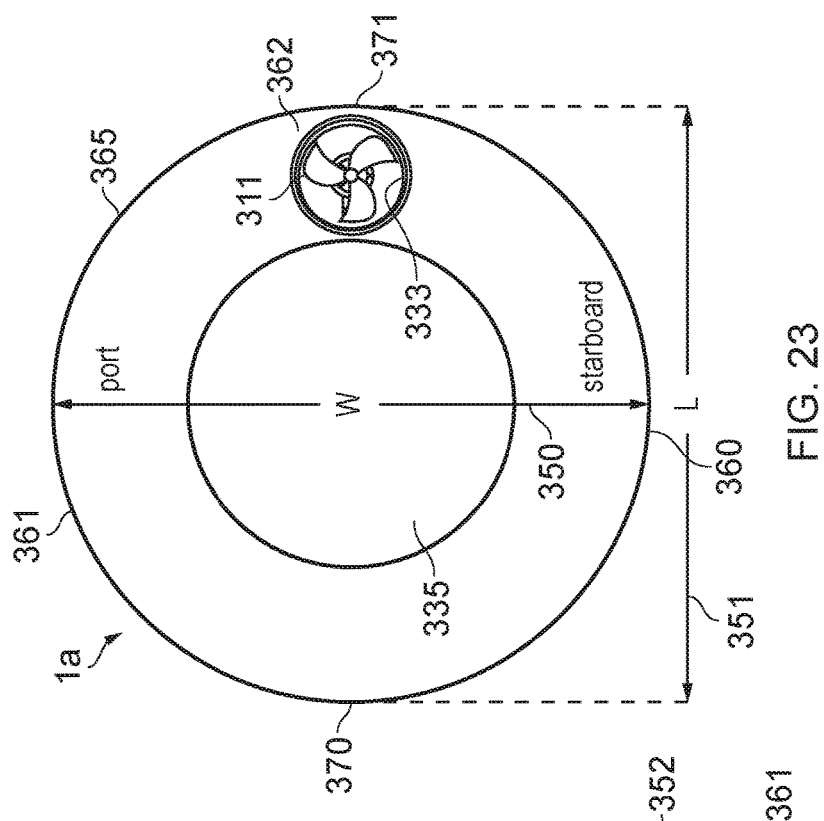
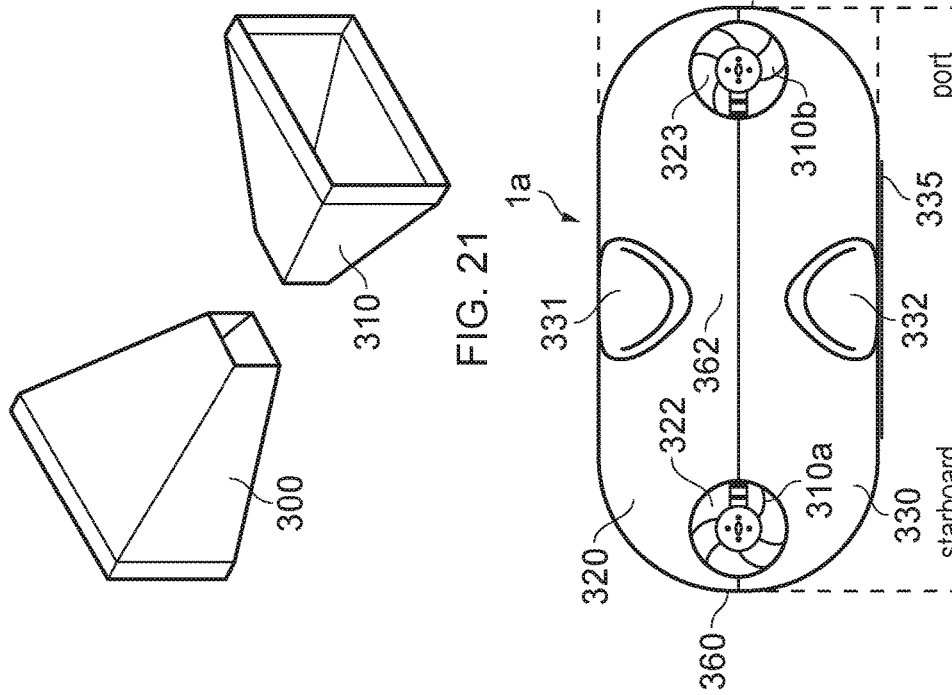

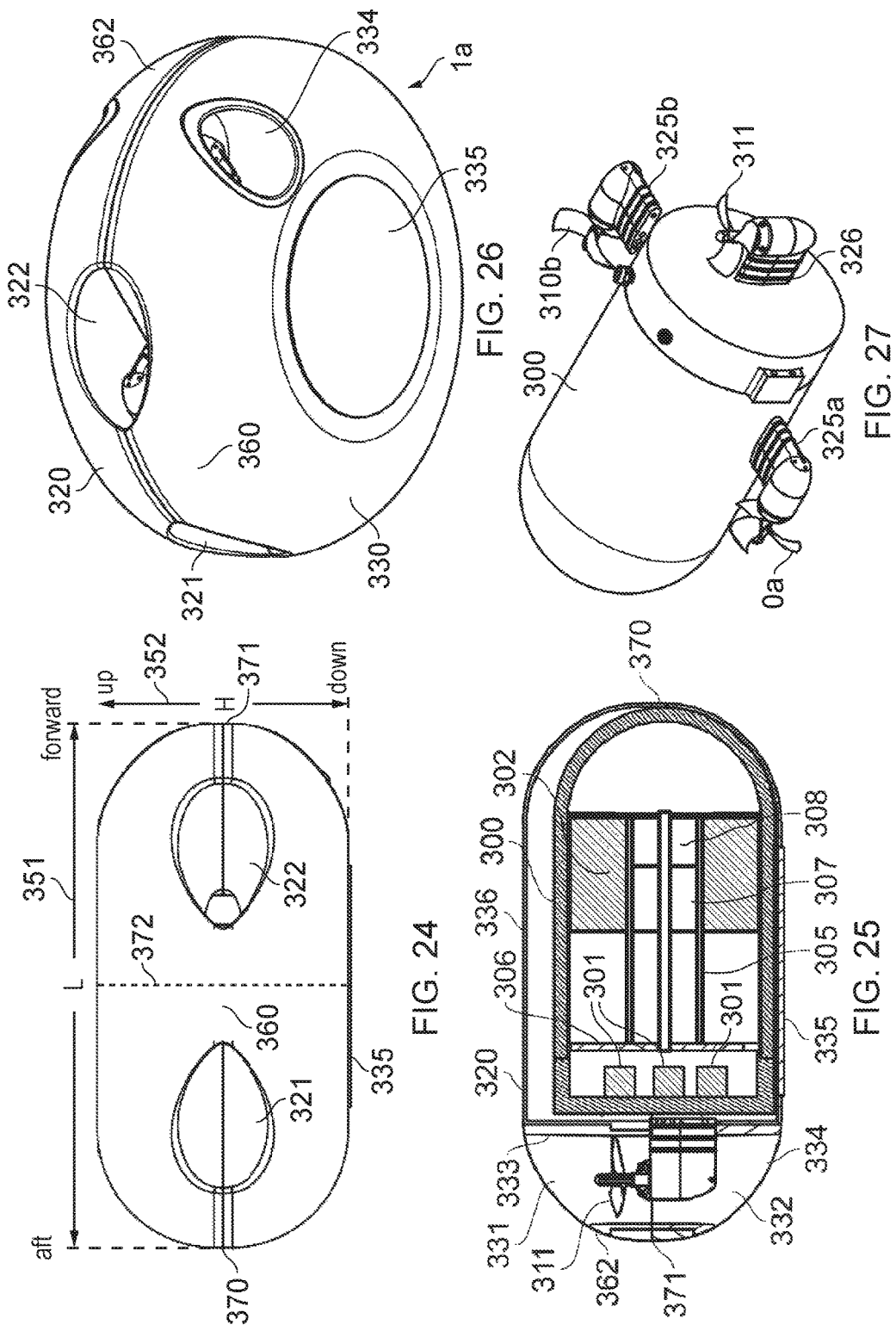

DEPLOYMENT AND RETRIEVAL METHODS FOR AUVS

The present application is a submission under 35 U.S.C. § 371 of international application no. PCT/GB2016/053189, filed 14 Oct. 2016 and published in the English language with publication no. WO 2017/064503 A1 on 20 Apr. 2017, which claims the benefit of the filing date of GB 15 18297.5, filed 16 Oct. 2015, the contents of which are incorporated herein by reference.

FIELD OF THE INVENTION

The present invention relates to a method of deploying or retrieving autonomous underwater vehicles (AUVs), and an associated submersible device for deploying or retrieving autonomous AUVs.

BACKGROUND OF THE INVENTION

Known methods of conducting seismic surveys are disclosed in U.S. Pat. Nos. 8,881,665; 8,310,899; 7,632,043; and US2014/0177387.

SUMMARY OF THE INVENTION

A first aspect of the invention provides a submersible device for deploying or retrieving autonomous underwater vehicles (AUVs), the submersible device comprising: two or more platforms arranged in a stack, wherein each platform is configured to carry two or more of the AUVs; a port; and a transfer mechanism comprising a transfer device arranged to load or unload the AUVs onto or from the platforms, and an actuator arranged to move the transfer device between the platforms and the port in order to transfer the AUVs between the platforms and the port.

The submersible device of the first aspect of the invention is compact and has relatively low drag, making it well suited for use in a deployment or retrieval method in which the device moves through the water (for instance by being towed, or by moving under its own motive power). In particular, the use of a single port (rather than multiple ports—one per platform) results in low drag, and enables the port to be made sufficiently large to enable AUVs to be deployed or retrieved easily.

A further aspect of the invention provides method of deploying autonomous underwater vehicles (AUVs) with a deployment device, the deployment device comprising two or more platforms arranged in a stack, each platform carrying two or more of the AUVs, and a deployment port, the method comprising: submerging the deployment device; and after the deployment device has been submerged, unloading the AUVs from the platforms with a transfer device, moving the transfer device between the platforms and the deployment port in order to transfer the AUVs from the platforms to the deployment port, and deploying the AUVs from the deployment port (for instance by operating thrusters of the AUVs).

A further aspect of the invention provides a method of retrieving autonomous underwater vehicles (AUVs) with a submerged retrieval device, the submerged retrieval device comprising two or more platforms arranged in a stack, a transfer device, and a retrieval port, the method comprising: receiving the AUVs at the retrieval port, moving the transfer device between the retrieval port and the platforms in order to transfer the AUVs from the retrieval port to the platforms, and loading the AUVs from the transfer device onto the platforms so that each platform carries two or more of the AUVs.

Various optional features are set out in the dependent claims.

Each platform may comprise a single platform member which is configured to carry two or more of the AUVs. Alternatively each platform may comprise a set of separate sub-platforms, all lying at the same level in the stack, in which each sub-platform is configured to carry one or more of the AUVs. In a preferred embodiment each platform comprise a set of three separate sub-platforms, all lying at the same level in the stack, in which each sub-platform is configured to carry two AUVs.

Preferably the platforms are rotatably mounted to a chassis so that the platforms can be rotated about a common axis relative to the chassis. For instance a first set of the platforms may be arranged in a first stack and rotatably mounted to the chassis (that is, they form a carousel) so that the first set of platforms can be rotated about a first common axis relative to the chassis, and a second set of the platforms may be arranged in a second stack and rotatably mounted to the chassis (that is, they form a carousel) so that the second set of platforms can be rotated about a second common axis relative to the chassis. Optionally the actuator is arranged to move the transfer device along a transfer channel between the first and second stacks—typically a vertical transfer channel. Alternatively the platforms may be fixed relative to the chassis, or they may have conveyer belts (or some other transport mechanism) which can be operated to transport AUVs to or from the transfer device.

The platforms may be permanently fixed to a chassis, or they may be integrated into one or more pallets which are removably mounted to the chassis so that the pallet(s) can be removed from the chassis with the pallet(s) carrying the AUVs.

Optionally the platforms are stacked in a stacking direction (which is typically approximately vertical as the AUVs are deployed or retrieved) and the actuator is arranged to move the transfer device in the stacking direction in order to transfer the AUVs between the platforms and the port.

The transfer device may be arranged to support an AUV with a support member under the AUV, by gripping sides of the AUV with a pair of gripping jaws, by the action of a vacuum, or by the action of a magnetic field.

The transfer device may be arranged to transfer the AUVs one-by-one between the platforms and the port, or it may be arranged to simultaneously transfer multiple AUVs between the platforms and the port.

Optionally the deployment device is submerged with the platforms carrying the AUVs. Alternatively the deployment device may be submerged empty, and subsequently loaded with the AUVs under water.

The submerged deployment or retrieval device may be towed with a surface vessel as the AUVs are deployed or retrieved. Alternatively the device may be stationary during deployment or retrieval, or it may move under its own motive power.

Optionally a thruster of each AUV may be operated after it has been deployed so that it moves away from the submerged deployment device.

Optionally after the AUVs have been loaded into the submerged retrieval device, the submerged retrieval device containing the AUVs is lifted out of the water and onto a surface vessel.

Optionally the device is provided in combination with a plurality of AUVs, each AUV comprising at least one thruster.

Optionally each AUV comprises: port and starboard thrusters spaced apart in a port-starboard direction, each thruster being oriented to generate a thrust force in a fore-aft direction perpendicular to the port-starboard direction; a vertical thruster which is oriented to generate a thrust force substantially perpendicular to the fore-aft and port-starboard directions; port, starboard and vertical ducts which contain the port, starboard and vertical thrusters respectively, each duct providing a channel for water to flow through its respective thruster; and a moving mass which can be moved relative to the thrusters in the fore-aft direction to control a pitch of the underwater vehicle.

Optionally each AUV comprises: a body with a nose and a tail at opposite ends of the underwater vehicle; port and starboard thrusters carried by the body, each thruster housed within a respective duct, each duct providing a channel for water to flow through its respective thruster (typically in a fore-aft direction) during operation of the thruster; and a moving mass system comprising a mass and an actuator for moving the mass relative to the body (typically forwards or backwards) to control a pitch of the AUV, wherein the AUV has a mid-plane (preferably perpendicular to the fore-aft direction) which lies half way between the nose and the tail and passes through both ducts, and wherein the thrusters are reversible so that they can be operated to generate forward thrust to drive the underwater vehicle forwards with the nose leading and operated to generate reverse thrust to drive the underwater vehicle backwards with the tail leading.

Typically each AUV has a maximum length L in the fore-aft direction and a maximum width W in the port-starboard direction. Preferably $0.8<L/W<1.2$, and most preferably $0.9<L/W<1.1$.

BRIEF DESCRIPTION OF THE DRAWINGS

Embodiments of the invention will now be described with reference to the accompanying drawings, in which:

FIG. 1 shows a method of deploying autonomous underwater vehicles (AUVs);

FIGS. 15-17 show the transfer mechanism holding an AUV;

FIG. 18-20 show the transfer mechanism without an AUV;

FIG. 21 shows the deployment and retrieval funnels;

FIG. 22 is a front view of an AUV;

FIG. 23 is a plan view of the AUV showing its planform profile;

FIG. 24 is a starboard side view of the AUV;

FIG. 25 is a cross-sectional view of the AUV viewed from the port side;

FIG. 26 is an isometric view of the AUV;

FIG. 27 is an isometric view of the pressure vessel and thrusters;

DETAILED DESCRIPTION OF EMBODIMENT(S)

Figure 2:
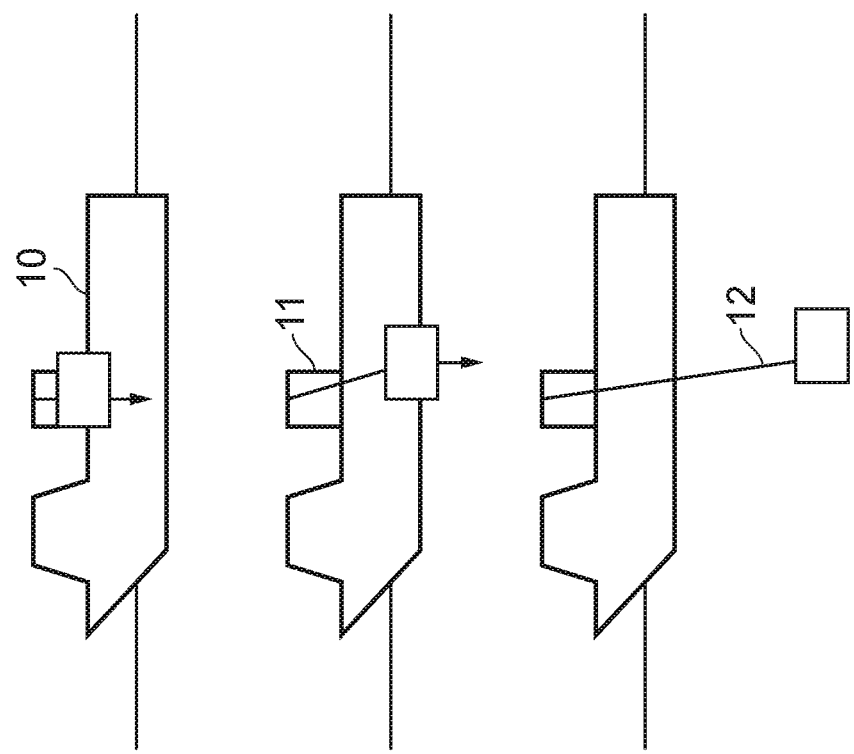
FIG. 2 shows a deployment/retrieval device being lowered into the water.

A method of deploying autonomous underwater vehicles (AUVs) 1a-c with a deployment/retrieval device 2 is shown in FIGS. 1 and 2. The device 2 will be described in detail below, but in general comprises a pair of carousels 3a,b, each carousel carrying a stack of thirty six AUVs. The device 2 is loaded with seventy two AUVs on the deck of a surface vessel 10. The device 2 carrying the AUVs is then lowered into the water by a crane 11 and a tether 12 as shown in FIG. 2 until it is at a required depth. At this point the surface vessel 10 may be stationary or it may be moving.

After the device 2 containing the AUVs has been submerged as in FIG. 2, the surface vessel 10 is driven to the left as shown in FIG. 1 so that it tows the submerged deployment device containing the AUVs. The AUVs are then deployed one-by-one from the device 2 as it is towed by the surface vessel. The towing speed is typically between 0.5 m/s and 2.5 m/s, and most preferably between 1 m/s and 2 m/s. For example the towing speed may be 1.5 m/s. Each carousel has six platforms, each platform carrying six AUVs. As the surface vessel moves, a transfer device (not shown) within the device 2 unloads the AUVs one-by-one from the platforms, and moves between the platforms and a deployment funnel in order to transfer the AUVs one-by-one from the platforms to the deployment funnel. The AUVs are then deployed one-by-one from the deployment funnel. As shown in FIG. 1, a thruster of each AUV 1a-c is operated after it has been deployed so that it moves horizontally away from the towed device 2.

Figure 3:
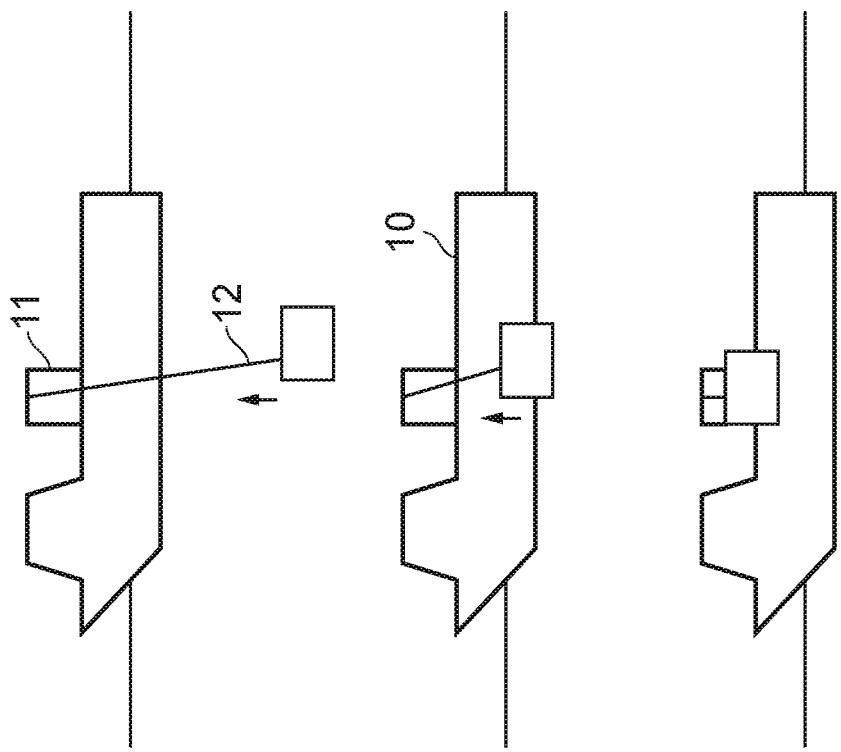
FIG. 3 shows a deployment/retrieval device being lifted from the water.
Figure 4:
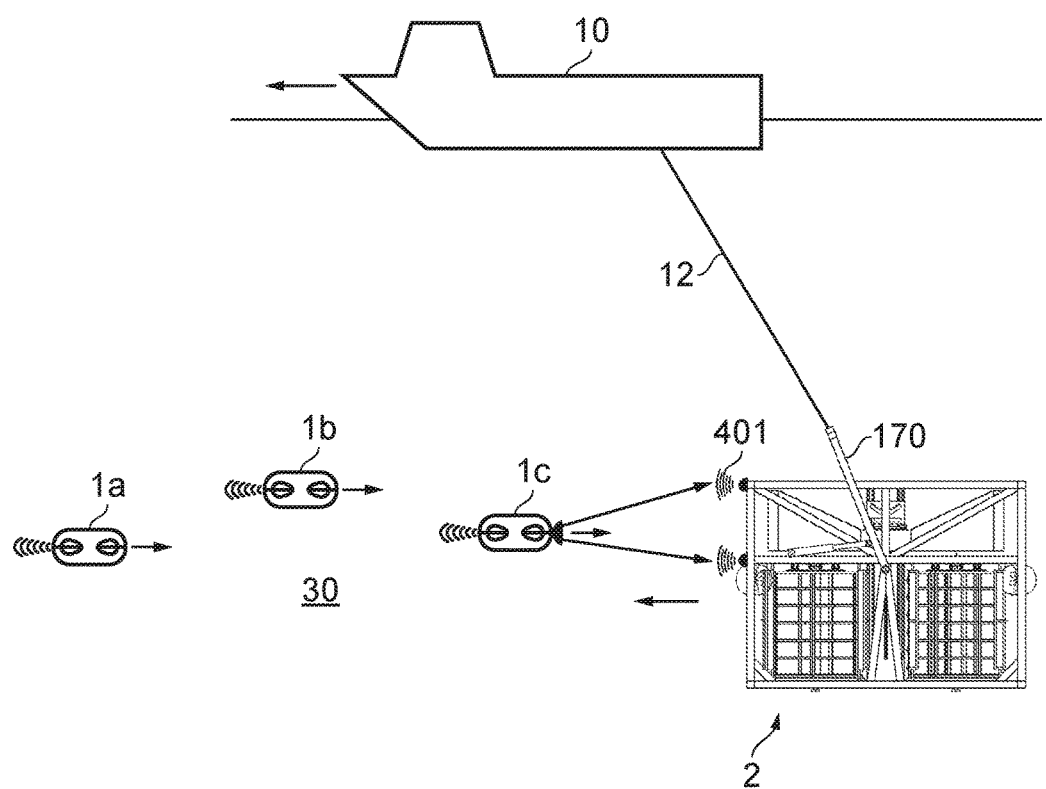
FIG. 4 shows a method of retrieving AUVs.
Figure 5:
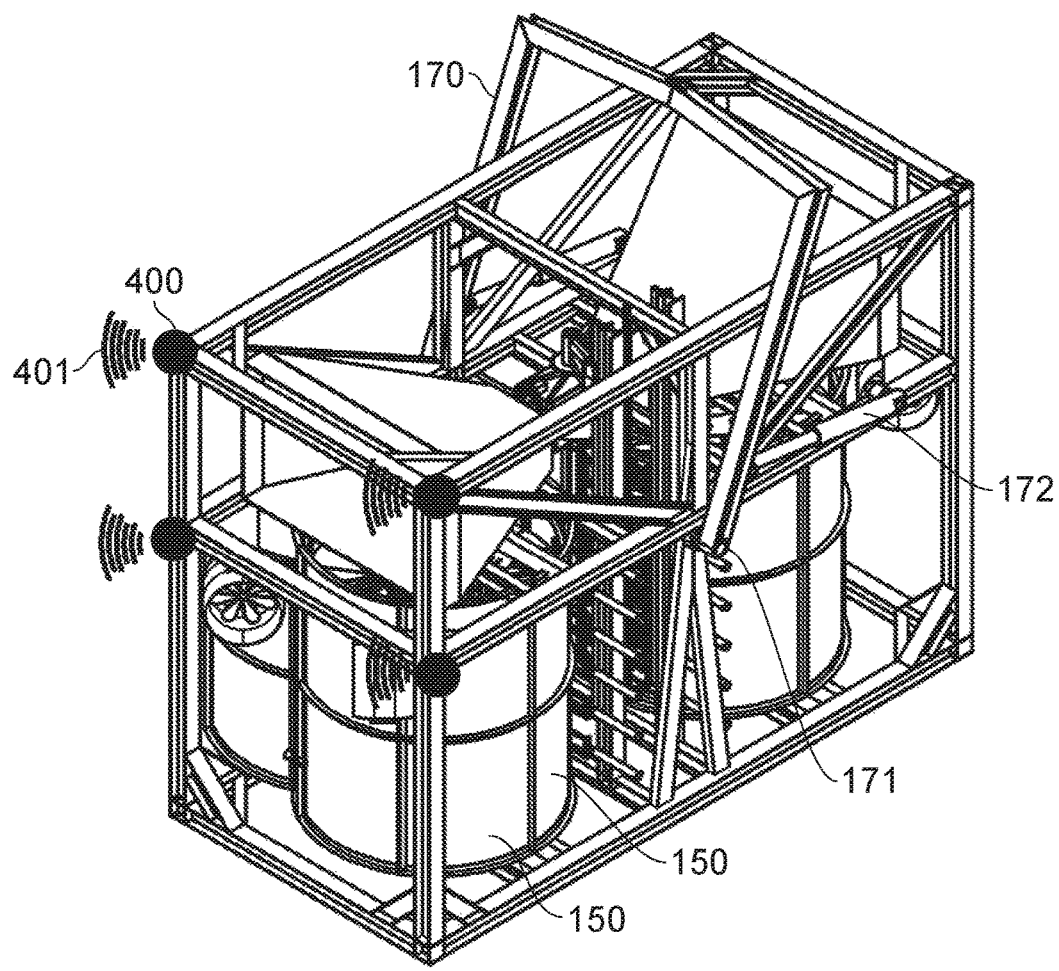
FIG. 5 is an isometric view of a deployment/retrieval device.
Figure 7:
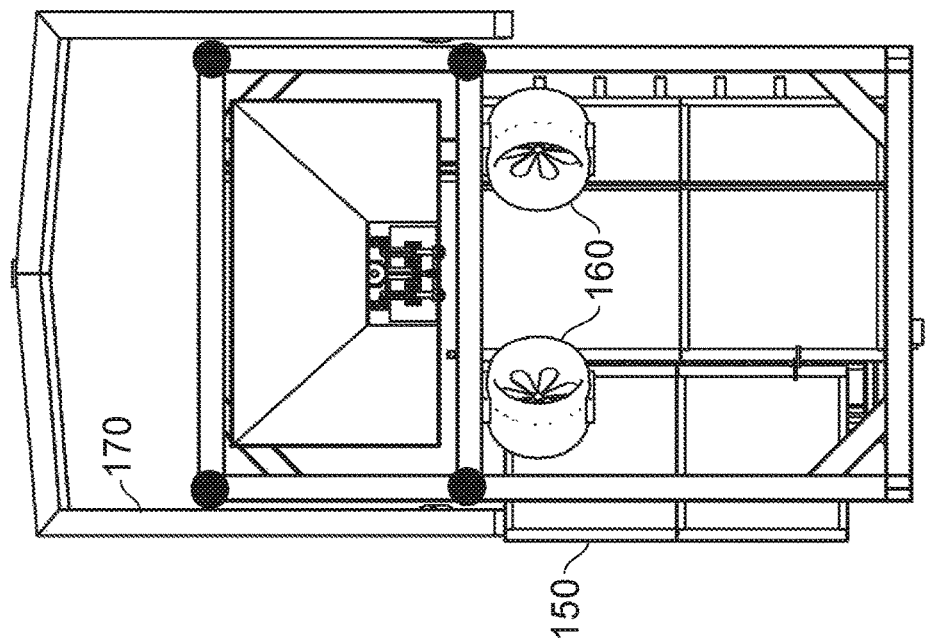
FIG. 7 is a front view of the device.
Figure 6:
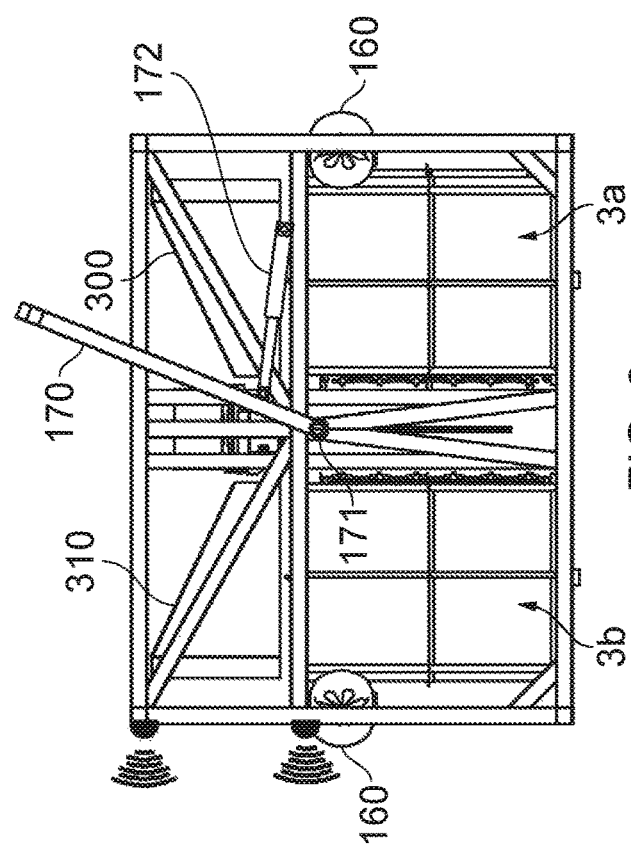
FIG. 6 is a port view of the device.

After the AUVs have been deployed as shown in FIG. 1, they descend autonomously to the seabed, and land at precisely controlled locations where they acquire seismic data during a seismic survey. When the survey is complete, the AUVs return to the surface vessel 10 where they are retrieved by essentially the reverse process to deployment, as shown in FIGS. 3 and 4. Thrusters of the AUVs are operated so that the AUVs form a line in front of the device in a retrieval zone 30 as shown in FIG. 4. The submerged device 2 is towed through the retrieval zone 30 by the surface vessel 10, and the AUVs are loaded one-by-one into a retrieval funnel of the device as it is towed through the retrieval zone 30 by the surface vessel. After the AUVs have been loaded into the towed device 2, the device 2 containing a full payload of the AUVs is lifted out of the water and onto the surface vessel by the crane 11 as shown in FIG. 3.

Figure 9:
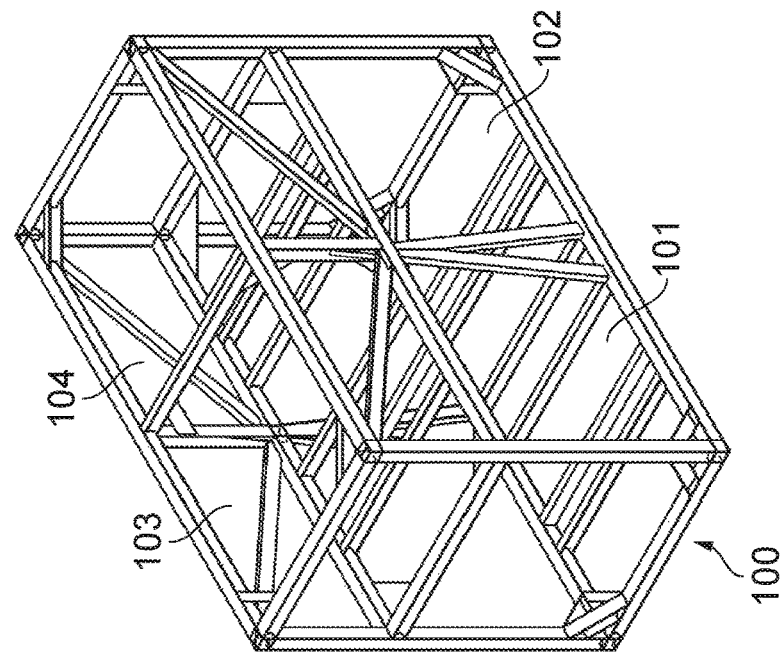
FIG. 9 is an isometric view of the chassis of the device.
Figure 11:
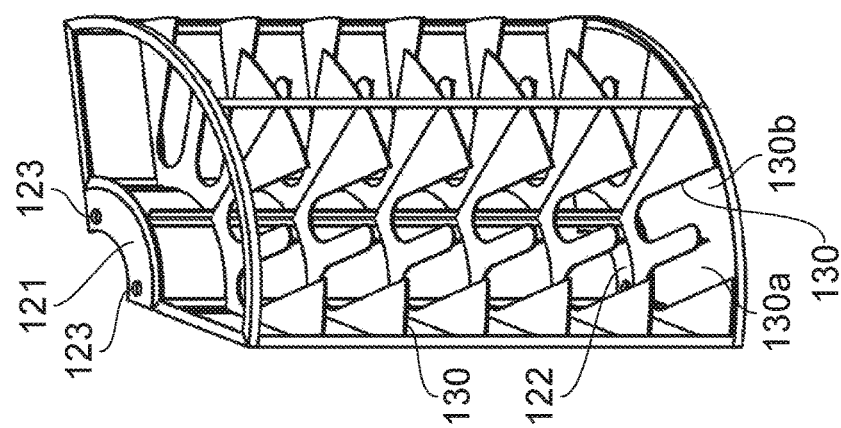
FIG. 11 is an isometric view of a pallet.
Figure 10:
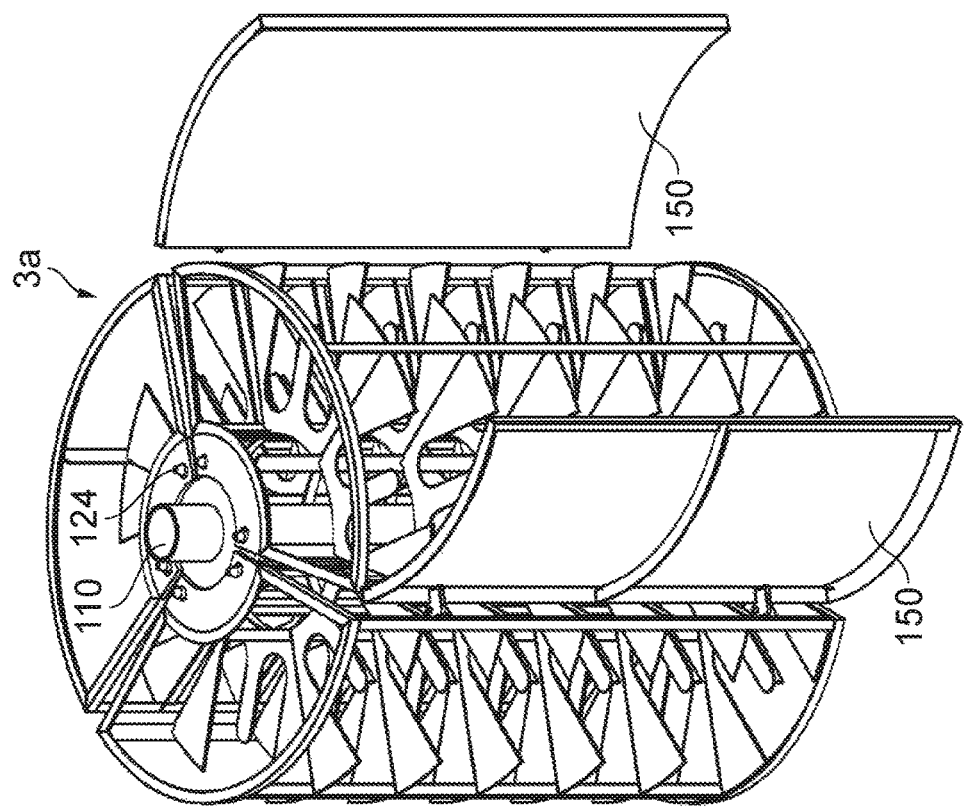
FIG. 10 is an isometric view of a carousel.

The submersible/retrieval device 2 will now be described in detail. The device 2 has a chassis or cage 100 shown in FIG. 9 divided into four segments: two segments 101, 102 at the bottom of the chassis for storing the AUVs and two segments 103, 104 at the top of the chassis for retrieving and deploying the AUVs. The two carousels 3a, b are mounted to the chassis 10 so that they can be rotated about a vertical axes relative to the chassis 100. FIG. 10 shows one of the carousels 3a in detail, without any AUVs. Each carousel comprises a vertical shaft 110 rotatably mounted to the chassis, and three removable pallets, one of which is shown in FIG. 11. Each pallet comprises a pallet chassis with an upper mounting part 121 and a lower mounting part 122, each having a pair of holes 123. The pallet chassis is mounted onto the shaft 110 by inserting pins 124 into the holes 123, and the pallet can be removed from the shaft 110 by lifting it off the pins 124. Each pallet chassis carries six platform segments 130 arranged in a vertical stack. Each platform segment 130 can accommodate two AUVs. The three platform segments 130 on each level of the stack together constitute a platform which can accommodate six AUVs (two AUVs per platform segment 130).

Figure 14:
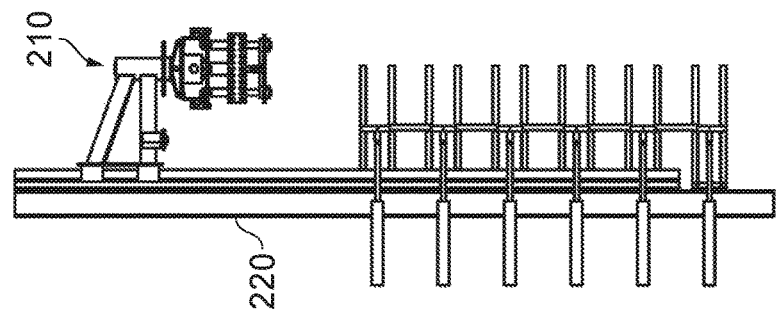
FIGS. 12-14 are isometric, plan and side views of a transfer mechanism.
Figure 13:
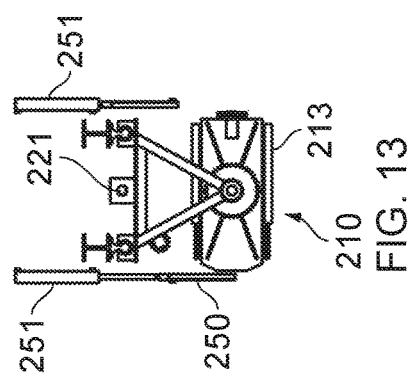
Figure 12:
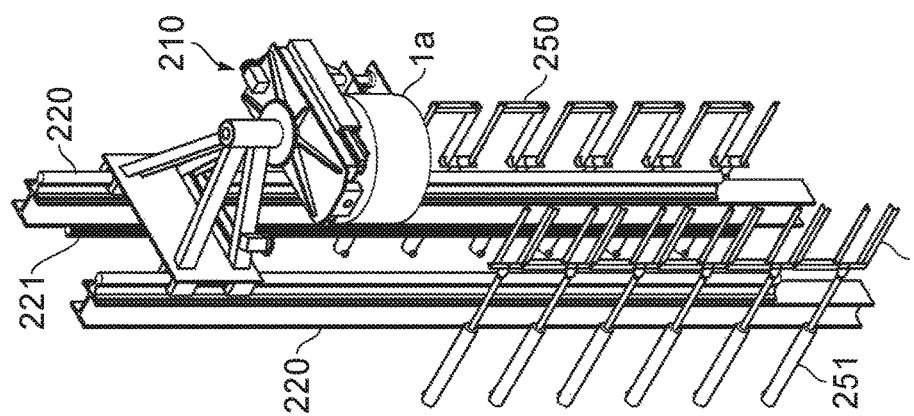

A transfer mechanism 200 shown in FIGS. 12-14 is mounted to the chassis and arranged to load and unload the AUVs from the platforms. A transfer device 210 is mounted on a pair of vertical rails 220 in a channel between the pair of carousels. The transfer device 210 can be driven up and down on the rails 220 by a lead screw 221 driven by an electric or hydraulic motor (not shown).

The transfer device 210 supports an AUV 1a as shown in FIG. 12 by gripping the AUV between a lower jaw 211 underneath the AUV and an upper jaw 212 above the AUV. The jaws 211, 212 are slidably mounted on a support frame 213, and can be driven horizontally by an electric or hydraulic motor 214 and a pair of drive cogs 215, 216 between a retracted position shown in FIGS. 12, 15, 16, 18 and 19 and an extended position shown in FIGS. 17 and 20.

In order to unload an AUV from a platform, the motor is first operated to rotate the lead screw 221 and drive the transfer device 210 down to a selected vertical level. The support frame 213 is rotated (if necessary) about a vertical axis by a motor (not shown) and drive cog 241 so that it faces a selected one of the carousels 3a,b. So for instance in FIG. 12 the support frame 213 is pointing left so it is facing the carousel on the left-hand side of FIG. 12, but it can be rotated by 180° by the drive cog 241 so that is facing the carousel on the right-hand side of FIG. 12. The selected carousel is also rotated on its shaft 110, if required, so that the platform segment 130 facing the transfer device is not empty.

Each level of the stack has an associated guard 250 carried by an actuator 251 (a solenoid or hydraulic ram). The guards 250 can be individually moved between an extended (closed) position and a retracted (open) position. FIG. 12 shows all of the guards 250 on the left-hand side in their extended (closed) position, and all of the guards 250 on the right-hand side in their retracted (open) position.

When the transfer device 210 has reached the selected vertical level of the stack and is pointing in the correct direction, then the appropriate guard 250 is retracted. Then the motor 214 is operated so that the jaws 211, 212 move horizontally to their extended position. The lower jaw 211 comprises a pair of arms 211a, b which are received in slots 130a, b in the platform segment 130 underneath the AUV.

The lower jaw 211 is suspended on a pair of struts 217 which are telescopically mounted within struts 218 suspended from the upper jaw 212. The lower jaw 211 can be driven up and down by an actuator 219, and as it does so the struts 217 slide in and out of the struts 218. As the jaws 211, 212 move horizontally to their extended position, a curved pad 260 contacts the side of the AUV as shown in FIG. 17. The actuator 219 then drives the lower jaw 211 up so that the AUV becomes clamped between the jaws 211, 212.

After the AUV has been gripped, the motor 214 is operated so that the jaws 211, 212 carrying the AUV retract back into the transfer channel. Then the support frame 213 is rotated (if necessary) by the drive cog 241 so that it faces in the deployment direction (rather than the retrieval direction). Next the lead screw 221 is rotated to drive the transfer device 210 carrying the AUV up the transfer channel until it reaches the position shown in FIGS. 5, 6, 8 and 12.

Figure 8:
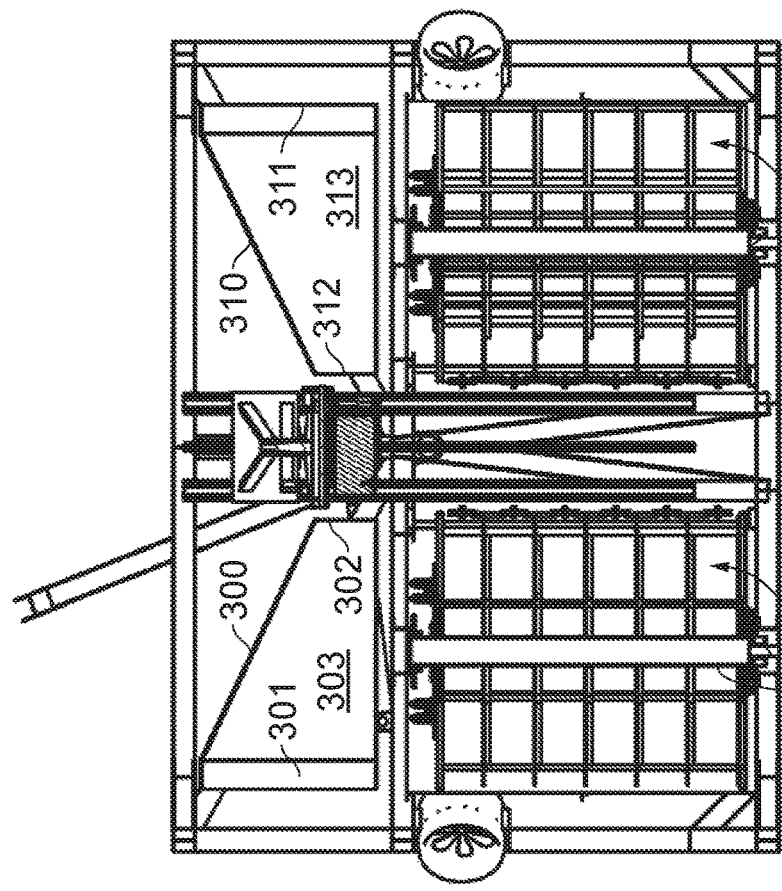
FIG. 8 is a cross-sectional view of the device.

As mentioned above, the chassis 100 has two segments 103, 104 at the top of the chassis for retrieving and deploying the AUVs. A retrieval funnel 300 (FIG. 21) is mounted within the segment 103 at the front of the device 2 and a deployment funnel 310 is mounted within the segment 104 at the rear of the device 2. Each funnel has a wide opening facing out of the device, and a narrow opening facing into the device. So as shown in FIG. 8 the retrieval funnel 300 has a wide forward-facing opening 301 for receiving AUVs during the retrieval process of FIG. 4, a narrow rear-facing opening 302 for feeding the AUVs towards transfer device 210, and a retrieval channel 303 between the openings 301, 302. Similarly the deployment funnel 300 has a narrow forward-facing opening 312 for receiving the AUVs from the transfer device 210, a wide rear-facing opening 311 for deploying AUVs during the deployment process of FIG. 1, and a deployment channel 313 between the openings 311, 312.

During the deployment process, when the transfer device 210 has reached the narrow opening 312 of the deployment funnel 300, the jaws are released and the AUV is forced out of the wide opening 311 of the deployment funnel by the action of the water flowing through the deployment channel 313. That is—the towing motion causes a flow of water through the deployment channel 313 of the deployment funnel and this flow generates a motive force which ejects the AUV out of the device. Optionally the AUV may also operate its thrusters to assist its ejection from the deployment funnel 310.

Four homing devices 400, such as acoustic transmitters, are arranged to output homing signals 401 (such as acoustic signals) which guide the AUVs to the retrieval funnel 300 during the retrieval process as shown in FIG. 4.

During the retrieval process, the transfer device 210 receives the AUVs one-by-one at the narrow opening 302 of the retrieval funnel. It then grips the AUV and transfers it down to a vacant platform. A selected carousel 3a, b is rotated, if required, so that the platform segment facing the transfer device is vacant. The appropriate guard 250 is then retracted, the motor 214 is operated so that the jaws 211, 212 move horizontally to their extended position, the AUV is released so that it drops onto the platform, and the jaws 211, 212 are retracted.

The AUV may optionally operate its thrusters as shown in FIG. 1 to force it into the retrieval funnel 300, or it may be stationary and "swallowed up" by the towed device 2. The towing motion causes a flow of water through the retrieval channel 303 of the retrieval funnel which guides the AUV towards the narrow opening 302 of the retrieval funnel.

When the device 2 is full, it is lifted up onto the deck of the surface vessel as shown in FIG. 3. Two pairs of doors 150 are then opened as shown in FIG. 10, and the six full pallets are lifted off their mounting pins 124 and removed. Six empty pallets are then immediately loaded onto the device 2 which is then submerged and towed to retrieve a further batch of seventy two AUVs.

A similar process is followed during deployment. That is: the device 2 is lowered into the water with a full payload of AUVs as shown in FIG. 2; the AUVs are deployed as in FIG. 1; the empty device 2 is lifted up onto the deck of the surface vessel; the doors 150 are opened; the six empty pallets are lifted off their mounting pins and removed; and six full pallets are then immediately loaded onto the device 2 which is submerged and towed to deploy a further batch of seventy two AUVs.

The device has four ducted propellers 160 mounted at its four corners and oriented at 45° to the towing direction. Propellers 160 are used to control the yaw angle of the device 2 as it is towed so it adopts the orientation shown in FIGS. 1 and 4. The tether 12 is attached to the device 2 by a towing arm 170 which is rotatably mounted to the chassis at a pivot 272. A pair of damping devices 172 act on the arm 170 to provide a damping action. The arm 170 rotates about the pivot 272 so that the device 2 adopts a level pitch during towing as shown in FIGS. 1 and 4.

To sum up: the submersible device 2 can be used to deploy and/or retrieve AUVs. The device has two carousels 3a,b, each carousel having six platforms arranged in a vertical stack, each platform being configured to carry six AUVs. Each platform is divided into three removable sub-platforms 130. The transfer mechanism of FIG. 12 loads or unloads the AUVs one-by-one onto or from the platforms using a transfer device 210. The platforms are stacked in a vertical stacking direction, and a lead screw 221 of the transfer mechanism is arranged to move the transfer device 210 in the vertical stacking direction in order to transfer the AUVs between the platforms and the deployment and retrieval funnels.

The device 2 receives electric power from the tether 12. If electric motors and actuators are used then they receive this power directly—if hydraulic motors and actuators are used then the device 2 will have a hydraulic power unit which converts the electrical power transmitted down the tether 12 into hydraulic power.

The AUVs 1a-c are illustrated schematically in FIGS. 8, 12 and 15-17, but FIGS. 22-30 show an exemplary one of the AUVs 1a in detail. The AUV comprises a body with a nose 371 and a tail 370 at opposite ends of the AUV. The body of the AUV comprises a cylindrical pressure vessel 300 (FIG. 27) contained within a housing formed by upper and lower shells 320, 330. The pressure vessel 300 contains batteries 302 and three orthogonally oriented seismic sensors 301 (FIG. 25). Starboard and port horizontal thrusters 310a,b are carried by the body and can be operated to propel the AUV forward and backwards. A single vertical thruster 311 is also carried by the body and can be operated to control the pitch angle of the AUV and effect a vertical take-off from the seabed as will be described in further detail below. Each thruster 310a,b, 311 comprises a propeller housed within a respective duct.

The pressure vessel and thrusters are contained within a housing formed by the upper and lower shells 320, 330 which meet at respective edges around the circumference of the AUV. The upper shell 320 forms a downward-facing cup and the lower shell 330 forms an upward-facing cup. The shells 320, 330 together provide a hydrodynamic hull of the AUV, including a port shroud 360 (FIG. 23) which shrouds the port thruster 310b, a starboard shroud 361 which shrouds the starboard thruster 310a, and a vertical shroud 362 which shrouds the vertical thruster 311.

The shells 320, 330 together provide three ducts which contain the three thrusters 310a,b, 311. A vertical duct 332 (FIG. 25) contains the vertical thruster 311 as shown in FIG. 25. The vertical duct 332 has an opening 331 in the upper shell and an opening 334 in the lower shell, and provides a vertically oriented channel for water to flow through the vertical thruster 311 when it is generating vertical thrust. The vertical duct 332 is bounded by a wall 333 which is circular in cross-section transverse to the flow direction through the duct. Each shell 320, 330 also has four recesses formed in its edge where it meets the other shell, the eight recesses together providing four openings 321-324 for port and starboard horizontal ducts 338, 339 (FIG. 29) which contain the horizontal thrusters. Each horizontal duct has a respective forward opening 322, 323 (FIG. 22) at a forward end of the duct and an aft opening 321, 324 (FIG. 28) at an aft end of the duct. As shown in FIG. 29, the horizontal ducts 338, 339 are circular in cross-section transverse to the flow direction through the duct. The port duct 338, 323, 324 provides a channel for water to flow through the port thruster 310b, and the starboard duct 339, 321, 322 provides a channel for water to flow through the starboard thruster 310a.

The lower shell 330 includes a planar disc 335. The disc 335 acts as a base for the AUV, with a substantially planar downward-facing external surface which can provide a stable platform for the AUV when it is sitting on a platform segment 130 or on the seabed. The upper shell includes an upper skin 336 opposite the disc 335 with a substantially planar upward-facing external surface. Thus the AUV can land upside down if necessary. The disc 335 and upper skin 336 also have substantially planar internal faces—this maximises the internal space of the AUV.

The batteries 302 can be moved relative to the rest of the AUV in a fore-aft direction 351 to control a pitch angle of the AUV. The batteries 302 slide fore-and aft on rails 305 shown in FIGS. 25 and 29. In FIG. 25 the batteries 302 are positioned fully aft but they can be moved forward until they engage a plate 306 towards the front of the pressure vessel in order to reduce the angle of pitch of the AUV. The range of travel of the batteries 302 is sufficient to adjust the pitch of the AUV from 0° (level) to 60° (nose up). When the batteries are positioned fully aft as in FIG. 25 the pitch angle is 60° (with the nose 371 pointing up).

The batteries are moved by an actuation system comprising a motor 307 which engages a lead screw 308, rotation of the motor 307 driving the motor 307 and the batteries 302 fore and aft.

Figure 28:
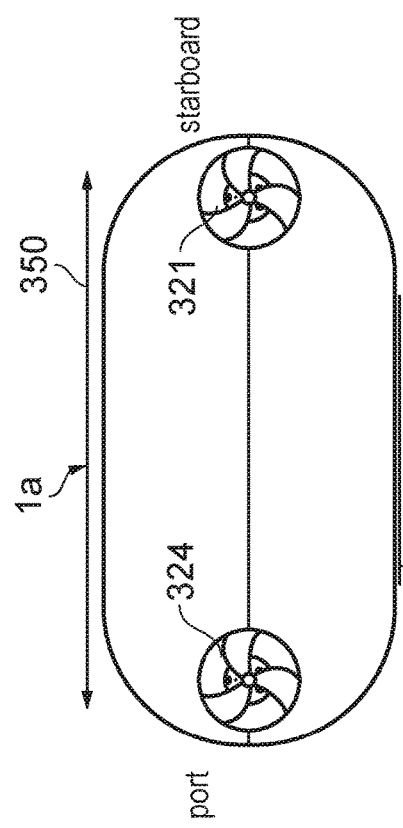
FIG. 28 is a rear view of the AUV.
Figure 29:
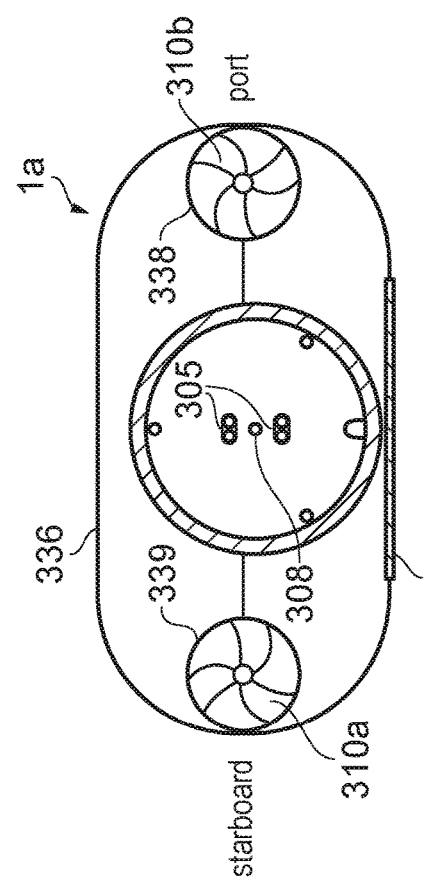
FIG. 29 is a cross-sectional view of the AUV viewed from the front.

The horizontal thrusters 310a,b are spaced apart in a port-starboard direction 350 shown in FIGS. 23 and 28. Each horizontal thruster is oriented to generate a thrust force in a fore-aft direction 351 perpendicular to the port-starboard direction 350. The port and starboard ducts 338, 339 are aligned parallel with this fore-aft thrust direction 351. The vertical thruster 311 is oriented to generate a thrust force in a height direction 352 (FIG. 22) perpendicular to the fore-aft and port-starboard directions 350, 351. The vertical duct 332 is aligned parallel with this vertical thrust direction 352.

The horizontal thrusters 310a,b are each reversible (i.e. they can be spun clock-wise or anti-clockwise) so that their thrust forces can be switched between being directed forward and being directed aft. As shown in FIG. 27, the pressure vessel 300 carries the horizontal thrusters on struts 325a,b on the starboard and port sides of the pressure vessel 300. The struts 325a,b are fixed, so the orientations of the horizontal thrusters 310a,b are fixed relative to the pressure vessel and the rest of the AUV. Therefore their thrust forces cannot be re-oriented relative to the rest of the AUV at an angle from the fore-aft direction 351. The horizontal thrusters 310a,b can be driven together to drive the AUV forwards or backwards, or driven differentially to control its yaw angle.

In an alternative embodiment (not shown) the horizontal thrusters 310a,b may be thrust-vectored like the thrusters in U.S. Pat. No. 7,540,255—that is, their thrust forces can be re-oriented at an angle from the fore-aft direction (for instance to effect vertical take-off). However this is less preferred because it would make them more complex, and more difficult to shroud compactly.

A typical mission profile for the AUV is shown in FIG. 31. The AUV has a centre of gravity (G) below its centre of buoyance (B). During deployment (FIG. 31a) the batteries 302 are positioned fully forward so the pitch angle of the AUV is 0°, and the horizontal thrusters generate a thrust T which can either drive the AUV backwards (tail first) out of the deployment/retrieval device 2 as shown in FIG. 31b, or forwards (nose first). On descent (FIG. 31b) the batteries 302 are moved aft so the pitch angle of the AUV increases to 60°, and the horizontal thrusters are operated to generate a thrust T which drives the AUV backwards (tail first). On arriving at the seabed 380 (FIG. 1c) the batteries 302 are moved forward so the pitch angle of the AUV returns to 0° and the AUV rests stably on the seabed. To take off (FIG. 31d) the batteries 302 are moved aft and a vertical thrust T from the vertical thruster 311 causes the AUV to lift off and pitch nose up. On ascent (FIG. 31e) the vertical thruster 311 is turned off and the horizontal thrusters generate a thrust T which drives the AUV forwards (nose first) with its nose up. Finally, the AUV is retrieved by the device 2 as in FIG. 3f with its batteries 302 moved forward so the pitch angle is 0°.

Figure 31A:
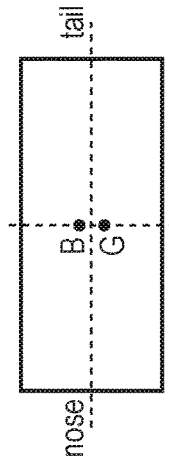
FIG. 31a-f show six stages in a mission of the AUV.
Figure 31B:
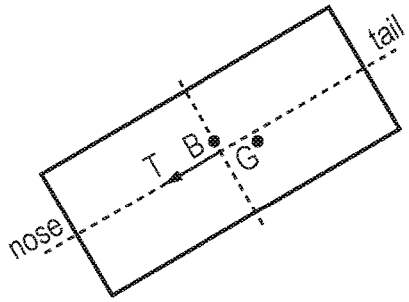
Figure 31C:
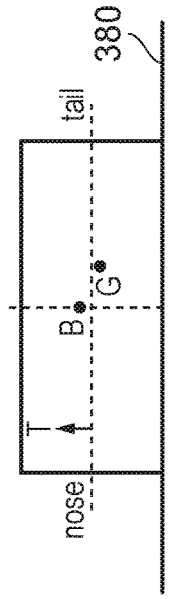
Figure 31F:
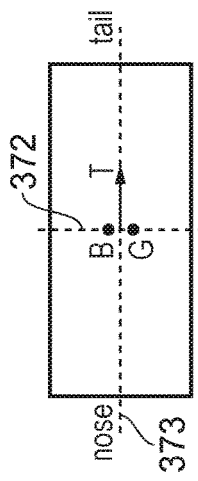
Figure 31E:
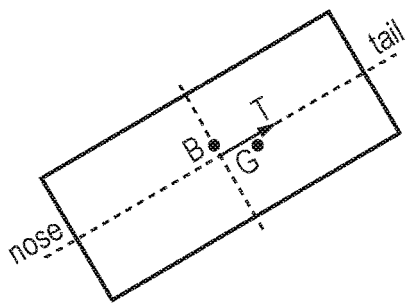
Figure 31D:
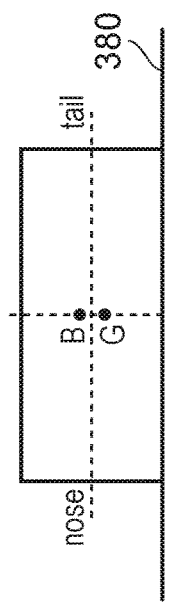

The vertical thruster 311 is positioned so that its thrust force is offset forward from the centre of gravity (G) and centre of buoyancy (B), so that as well as being used to effect vertical take-off as in FIG. 31d it can also be used to achieve fine pitch control. However this method of pitch control is not efficient over a long period, hence the use of a moving mass (in this case, the batteries 302) as a more efficient method of controlling the steady state pitch of the AUV during descent and ascent. The moving mass allows the centre of gravity to be moved near to the centre (level pitch) for deployment and recovery (FIG. 31a,f) and when the AUV is on the seabed (FIG. 31c). Having the centre of gravity central on the seabed means the moment arm acting on the AUV from ocean currents is the same regardless of the direction of the ocean current.

The AUV is designed to travel efficiently both forwards and backwards. If this was not the case, the AUV would need to be capable of adjusting its pitch from −60° to 60° during a mission instead of from 0° to 60°. This would increase the amount of space required for the moving mass system and hence would increase the maximum fore-aft length of the AUV.

The AUV includes a buoyancy control system (not shown) for controlling its buoyancy during the mission. The buoyancy control system is preferably housed in the space between the pressure vessel 300 and the upper and lower shells 320, 330. The buoyancy control system may be, for example, an active system which is operated to make the AUV neutrally buoyant during deployment/retrieval (FIG. 31a,f), negatively buoyant during descent (FIG. 31b) and during a seismic survey (FIG. 31c), and positively buoyant during ascent (FIG. 31e).

Figure 30:
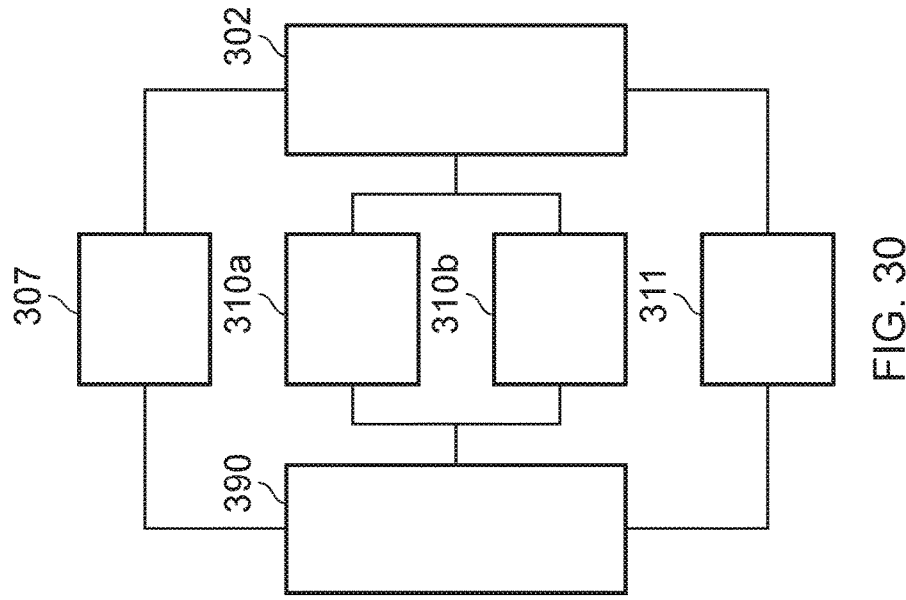
FIG. 30 is a schematic view of the AUV control system.

FIG. 30 is a schematic view of a control system for controlling the thrusters and moving mass. The pressure vessel 300 contains a controller 390 which is programmed to autonomously control the thrusters 310a, 310b, 311 and the motor 307 in order to follow the mission profile shown in FIG. 31. That is, the controller 390 is arranged to operate the horizontal thrusters to generate forward thrust to drive the AUV forwards with the nose leading during ascent, and also arranged to operate the thrusters to generate reverse thrust to drive the AUV backwards with the tail leading during descent. The batteries 302 supply power to the thrusters 310a, 310b, 311 and the motor 307.

The AUV has a maximum length L in the fore-aft direction as shown in FIGS. 23 and 24. The nose 371 and a tail 370 at opposite ends of the AUV are spaced apart in the fore-aft direction 351 by this maximum length L. Each horizontal thruster is housed within a respective horizontal duct 338, 339 with a forward duct opening 322, 323 at a forward end of the duct and an aft duct opening 321, 324 at an aft end of the duct. Each horizontal duct provides a channel for water to flow through its respective thruster in the fore-aft direction 351 during operation of the thruster. The motor 307 moves the batteries 302 relative to the body (forwards or backwards) to control a pitch of the AUV. The AUV has a fore-aft mid-plane 372 (shown in FIGS. 24 and 31a) which is perpendicular to the fore-aft direction 351 and lies half way between the nose 371 and the tail 370. The mid-plane 372 is also a perpendicular bisector of a fore-aft line between the nose and the tail.

The propellers of the horizontal thrusters are positioned on this mid-plane 372, and the mid-plane 372 also passes through both horizontal ducts 338, 339 as shown in FIG. 29 (which is a cross-section taken along the mid-plane 372). This amidships position of the horizontal thrusters (and their associated ducts) enables them to operate relatively efficiently whether they are driving the AUV forwards or backwards.

Although the horizontal thrusters 310a, b are positioned symmetrically (i.e. on the mid-plane 372) the horizontal thrusters 310a,b themselves are not symmetrical and they are more efficient when directing a thrust force which moves the AUV forwards. Since they must overcome gravity when the AUV is ascending, the horizontal thrusters are therefore used to drive the AUV forwards when it is ascending and backwards when it is descending (rather than vice versa).

In an alternative embodiment the horizontal thrusters 310a,b could be positioned towards the tail of the vehicle, or they could actuated so that they move to the nose or tail of the vehicle depending on the direction of travel. Although these thruster positions would be more efficient, the thrusters would be more difficult to shroud and they would need to protrude from the body of the AUV.

The vertical thruster 311 is also reversible (i.e. it can be spun clock-wise or anti-clockwise) so its thrust force can be switched between being directed up and down. However, it works most efficiently when the thrust is directed up to propel the nose of the AUV up as in FIG. 3d to effect vertical take-off from the seabed. As shown in FIG. 27, the pressure vessel 300 carries the vertical thruster on a strut 326 at the forward end of the pressure vessel 300. The strut 326 is fixed, so the orientation of the vertical thruster 311 is fixed relative to the pressure vessel 300 and the rest of the AUV. Therefore its thrust force cannot be re-oriented at an angle from the vertical direction 352.

In an alternative embodiment (not shown) the vertical thruster 311 may be thrust-vectored—that is, its thrust force can be re-oriented at an angle from the vertical direction relative to the pressure vessel 300 and the rest of the body of the AUV. However this is less preferred because it would make it more difficult to shroud compactly.

The overall shape of the AUV is a circular disc, and various significant aspects of its shape will now be discussed.

The port and starboard shrouds 360, 361 have a convex planform external profile when viewed from above in the height direction as in FIG. 23. Similarly the vertical shroud 362 at the tail of the AUV has a convex planform external profile when viewed from above in the height direction as in FIG. 23.

As can be seen in FIG. 23, the AUV (including the shrouds 360, 361, 371) has a substantially circular planform external profile when viewed from above in the height direction, except where the shells 320, 330 are cut away to provide the openings for the horizontal thrusters (these cut-away regions presenting a straight planform profile as indicated in FIG. 23 at 365, rather than a circular planform profile).

As can also be seen in FIG. 23 the AUV has a maximum length L in the fore-aft direction which is approximately equal to its maximum width W in the port-starboard direction. In other words the length-to-width aspect ratio (L/W) of the AUV is approximately one. This aspect ratio provides a number of advantages. Firstly—it enables the AUVs to be packed together efficiently when they are stored in the deployment/retrieval device 2, on the deck of the surface vessel 10, or at another storage location. Secondly—it enables the AUV to be easily rotated about a vertical axis in a confined space. Thus the AUV can be rotated without being removed from the pallet of FIG. 11 on the deck of the surface vessel in order to place it in the correct orientation for connecting a charging cable to a charging socket (not shown) in the side of the AUV. It also enables the AUV to rotate within the confined space of the thin end of the deployment funnel 310 during underwater deployment—operating its horizontal thrusters differentially to orient it in the correct direction with its nose or tail pointing out of the deployment funnel. Thirdly, when the AUV arrives at the seabed it can land in any orientation regardless of the direction of ocean currents. This can be contrasted with an AUV with a higher aspect ratio (L»W) which would present a higher drag profile to width-wise (port-starboard) currents than to length-wise (fore-aft) currents and hence must land with its length running parallel with the ocean currents to prevent it from being disturbed by them during the seismic survey.

Note that the AUV has no protruding parts such as fins, control surfaces, thrusters etc. which protrude from the side, front or back of the body of the AUV. Any such protruding parts might break during operation of the AUV. If such protruding parts are included in an alternative embodiment, then the length-to-width aspect ratio (L/W) of the AUV—including the protruding parts—may deviate from unity by up to 20%. In other words, in such an alternative embodiment 0.8<L/W<1.2. Alternatively the AUV may remain with no protruding parts but be shaped with a more elongated planform profile.

The AUV has a relatively small height relative to its length and width. In other words the AUV has a maximum height H in the height direction, and the maximum width (W) and maximum length (L) are both higher than the maximum height H. So with reference to FIG. 22 the AUV has a maximum height H between the disk 335 at the base of the AUV and the upper skin 336, a maximum width W between the port and starboard extremities of the shrouds 360, 361, and the width-to-height aspect ratio (W/H) is approximately 2.1. Similarly, with reference to FIG. 24, the AUV has a maximum length L between the nose 371 and tail 370, and the length-to-height aspect ratio (L/H) is approximately 2.1. This relatively small height provides the benefit of presenting relatively low drag to ocean currents when the AUV is stationed on the seabed, and also makes it less likely to being disturbed on the seabed by trawls and dredges.

Note that the AUV has no protruding parts such as fins, control surfaces, thrusters etc. which protrude from the top or bottom of the body of the AUV. Any such protruding parts might break during operation of the AUV. If such protruding parts are included in an alternative embodiment, then the height—including the protruding parts—may increase so the aspect ratios L/H and W/H may reduce to as low as 1.5. Alternatively the AUV may remain with no protruding parts but be shaped with a more heightened profile.

The body 300, 320, 330 of the AUV, and preferably the AUV as a whole (that is, including any shrouds, fairings, fins, control surfaces, thrusters or other protruding parts) has a planform external profile (that is, an external profile when viewed from above as in FIG. 23) with two lines of symmetry: a fore-aft line of symmetry running between the nose 371 and the tail 370, and a port-starboard line of symmetry running between the shrouds 360, 361. This provides a symmetrical hydrodynamic profile with similar drag characteristics regardless of whether the AUV is moving forwards or backwards.

Similarly the body 300, 320, 330 of the AUV, and preferably the AUV as a whole (that is, including any shrouds, fairings, fins, control surfaces, thrusters or other protruding parts) has an external profile when viewed from the side (as in FIG. 24) with at least two lines of symmetry: a fore-aft line of symmetry 373 shown in FIG. 31a running between the nose 371 and the tail 370, and a vertical line of symmetry running vertically from top to bottom (in the mid-plane 372). This also provides a symmetrical hydrodynamic profile with similar drag characteristics regardless of whether the AUV is moving forwards or backwards.

The openings 321-324 in the horizontal ducts have peripheral edges which are swept by 45° relative to the port-starboard direction (as can be seen by the 45° angle of the line 365 in FIG. 23) so that they are visible around their full circumference when viewed in the port-starboard direction as in FIG. 24. Similarly the top and bottom openings of the vertical duct have peripheral edges which lie at an angle to the fore-aft direction so that they are visible around their full circumference when viewed in the fore-aft direction as in FIG. 22.

Although the invention has been described above with reference to one or more preferred embodiments, it will be appreciated that various changes or modifications may be made without departing from the scope of the invention as defined in the appended claims.

The invention claimed is:

1. A submersible device for deploying or retrieving autonomous underwater vehicles (AUVs), the submersible device comprising:
    two or more platforms arranged in a stack, wherein each platform is configured to carry two or more of the AUVs;
    a port; and
    a transfer mechanism comprising a transfer device arranged to load or unload the AUVs onto or from the platforms, and an actuator arranged to move the transfer device between the platforms and the port in order to transfer the AUVs between the platforms and the port.

2. The submersible device of claim 1, wherein the submersible device is for deploying the AUVs, the port is a deployment port, the transfer device is arranged to unload the AUVs from the platforms, and the actuator is arranged to move the transfer device in order to transfer the AUVs from the platforms to the deployment port during deployment of the AUVs.

3. The submersible device of claim 2, wherein the deployment port comprises a deployment channel which is open at both ends so that during deployment of the AUVs a flow of water passes through the deployment channel, and the actuator is arranged to move the transfer device in order to transfer the AUVs from the platforms to the deployment channel during deployment of the AUVs.

4. The submersible device of claim 2, wherein the submersible device is for deploying and retrieving the AUVs, the submersible device further comprises a retrieval port, the transfer device is arranged to load the AUVs onto the platforms, and the actuator is arranged to move the transfer device in order to transfer the AUVs from the retrieval port to the platforms during retrieval of the AUVs.

5. The submersible device of claim 1, wherein the submersible device is for retrieving the AUVs, the port is a retrieval port, the transfer device is arranged to load the AUVs onto the platforms, and the actuator is arranged to move the transfer device in order to transfer the AUVs from the retrieval port to the platforms during retrieval of the AUVs.

6. The submersible device of claim 4, further comprising one or more homing devices arranged to output homing signals which can guide the AUVs to the retrieval port during the retrieval of the AUVs.

7. The submersible device of claim 1, further comprising a chassis, wherein the platforms are movably mounted to the chassis.

8. The submersible device of claim 1, further comprising a chassis, wherein the platforms are rotatably mounted to the chassis so that the platforms can be rotated about a common axis relative to the chassis.

9. The submersible device of claim 8 wherein a first set of the platforms are arranged in a first stack and rotatably mounted to the chassis so that the first set of platforms can be rotated about a first common axis relative to the chassis, and a second set of the platforms are arranged in a second stack and rotatably mounted to the chassis so that the second set of platforms can be rotated about a second common axis relative to the chassis.

10. The submersible device of claim 1, further comprising a chassis, wherein the platforms are integrated into a pallet which is removably mounted to the chassis so that the pallet can be removed from the chassis with the pallet carrying the AUVs.

11. The submersible device of claim 1, wherein the port comprises a funnel.

12. The submersible device of claim 1, wherein the transfer device is arranged to support an AUV with a support member underneath the AUV, by an action selected from a group consisting of: gripping sides of the AUV with a pair of gripping jaws, action of a vacuum, and action of a magnetic field.

13. The submersible device of claim 12 wherein the transfer device is arranged to support an AUV by gripping the AUV between a lower jaw underneath the AUV and an upper jaw above the AUV.

14. A method of deploying autonomous underwater vehicles (AUVs) with a deployment device, the deployment device comprising two or more platforms arranged in a stack, each platform carrying two or more of the AUVs, and a deployment port, the method comprising:
submerging the deployment device; and
after the deployment device has been submerged,
unloading the AUVs from the platforms with a transfer device;
moving the transfer device between the platforms and the deployment port in order to transfer the AUVs from the platforms to the deployment port; and
deploying the AUVs from the deployment port.

15. The method of claim 14, wherein the submerging step comprises submerging the deployment device with the platforms carrying the AUVs.

16. The method of claim 14, wherein the AUVs are unloaded one-by-one by the transfer device from the platforms, moved one-by-one by the transfer device from the platforms to the deployment port, and deployed one-by-one from the deployment port.

17. A method of retrieving autonomous underwater vehicles (AUVs) with a submerged retrieval device, the submerged retrieval device comprising two or more platforms arranged in a stack, a transfer device, and a retrieval port, the method comprising:
receiving the AUVs at the retrieval port;
moving the transfer device between the retrieval port and the platforms in order to transfer the AUVs from the retrieval port to the platforms; and
loading the AUVs from the transfer device onto the platforms so that each platform carries two or more of the AUVs.

18. The method of claim 17 further comprising after the AUVs have been unloaded from the transfer device onto the platforms, lifting the submerged retrieval device out of the water with the platforms carrying the AUVs.

19. The method of claim 17, wherein the AUVs are received one-by-one at the retrieval port, moved one-by-one by the transfer device from the deployment port to the platforms, and loaded one-by-one by the transfer device onto the platforms.

20. The method of claim 14, further comprising towing the submerged deployment device with a surface vessel as the AUVs are deployed.

* * * * *